United States Patent [19]

Driscoll

[11] Patent Number: 5,717,913
[45] Date of Patent: Feb. 10, 1998

[54] METHOD FOR DETECTING AND EXTRACTING TEXT DATA USING DATABASE SCHEMAS

[75] Inventor: James R. Driscoll, Orlando, Fla.

[73] Assignee: University of Central Florida, Orlando, Fla.

[21] Appl. No.: 368,045

[22] Filed: Jan. 3, 1995

[51] Int. Cl.⁶ ............................................. G06F 17/30
[52] U.S. Cl. ................................. 395/605; 395/604
[58] Field of Search ............................ 395/600, 605, 395/606

[56] References Cited

U.S. PATENT DOCUMENTS

| | | | |
|---|---|---|---|
| 4,674,066 | 6/1987 | Kucera | 395/605 |
| 4,907,971 | 3/1990 | Tucker | 434/167 |
| 5,101,349 | 3/1992 | Tokuume et al. | 364/419 |
| 5,133,349 | 7/1992 | Crus et al. | 395/600 |
| 5,168,565 | 12/1992 | Morita | 395/600 |
| 5,201,046 | 4/1993 | Goldberg et al. | 395/600 |
| 5,255,386 | 10/1993 | Prager | 395/600 |
| 5,297,039 | 3/1994 | Kanaegami et al. | 395/605 |
| 5,321,833 | 6/1994 | Cjhang et al. | 395/600 |
| 5,331,554 | 7/1994 | Graham | 395/605 |
| 5,386,556 | 1/1995 | Hedin et al. | 395/600 |
| 5,404,514 | 4/1995 | Kageneck et al. | 395/605 |
| 5,418,951 | 5/1995 | Damashek | 395/600 |
| 5,446,891 | 8/1995 | Kaplan et al. | 395/600 |
| 5,454,106 | 9/1995 | Burns et al. | 395/604 |
| 5,481,704 | 1/1996 | Pellicano | 395/605 |
| 5,488,725 | 1/1996 | Turtle et al. | 395/600 |
| 5,495,567 | 2/1996 | Iizawa et al. | 395/161 |
| 5,499,366 | 3/1996 | Rosenberg et al. | 395/600 |
| 5,535,382 | 7/1996 | Ogawa | 395/600 |
| 5,544,352 | 8/1996 | Egger | 395/600 |
| 5,555,367 | 9/1996 | Premerlani et al. | 395/161 |
| 5,590,322 | 12/1996 | Harding et al. | 395/604 |
| 5,630,120 | 5/1997 | Vachey | 395/602 |

*Primary Examiner*—Wayne Amsbury
*Attorney, Agent, or Firm*—Brian S. Steinberger; Law Offices of Brian S. Steinberger

[57] ABSTRACT

An Information Filtering (IF) system for retrieving relevant text data from a data base document collection is disclosed. A user can use this system to access a dynamic data stream to retrieve relevant data such as accessing e-mail or a wire-service. Alternatively, a user can use the IF system to access an data storage archive such as electronically stored patents, journals and the like. The invention includes several steps. The first step has a user reduce the information they are interested in into a tangible form such as manually writing a natural language user need statement, or alternatively imputing the statement electronically into a computer file for storage. The next step is to create a filter window having an adjustable document viewing text length, that will be used to electronically scan through the database collection of documents in order to determine a relevancy value for each scanned document. The filter can be created several ways using synonym and domain lists. Alternatively, the synonym and lists for each document can be determined by Entity-Relationship (ER) modelling to generate a search schema. After documents receive relevancy values, the user is free to view only those documents having relevancy values that exceed a preselected threshold value. Documents can be ranked from most relevant to least relevant. Feedback information from viewing the retrieved documents can be used to update the synonym/domain lists of the filtering window to enhance the relevance retrieval of subsequent documents.

11 Claims, 16 Drawing Sheets

Fig.4

\<top\>

\<head\> Tipster Topic Description

\<num\> Number: 122

\<dom\> Domain: Medical & Biological

\<title\> Topic: RDT&E of New Cancer Fighting Drugs

\<desc\> Description:

Document will report on the research, development, testing and evaluation (RDT&E) of a new anti-cancer drug developed anywhere in the world.

\<narr\> Narrative:

A relevant document will report on any phase in the worldwide process of bringing new cancer fighting drugs to market, from conceptualization to government marketing approval. The laboratory or company responsible for the drug project, the specific type of cancer(s) which the drug is designed to counter, and the chemical/medical properties of the drug must be identified.

\<con\> Concept(s):

1. cancer,leukemia 2. drug,chemotherapy

\<fac\> Factor(s):

\<def\> Defination(s):

\</top\>

Fig.5A

List 1 (refer to Fig.5B)
A synonym list for the word "counter":
    counter, cure, block, control,...

List 2 (refer to Fig. 5C)
A synonym list for the words "company" or "laboratory":
    company, laboratory, Inc., Co., Incorporated,...

List 3 (refer to Fig.5D)
A synonym list for the word "drug":
    drug, medicine, medication,...

List 4 (refer to Fig.5E)
A synonym list for the words "conceptualization",...,"approval":
    conceptualization,... ,approval, study, experiment,...

List 5 (refer to Fig.5F)
A synonym list for the word "properties":
    properties, attributes, characteristics,...

List 6 (refer to Fig.5G)
A synonym list for the word "cancer":
    cancer, cancerous, carcinogen, carcinoma,...

List 7 (refer to Fig.5H)
A domain list for names of companies or laboratories:
    SQUIBB, ROCHE, <others are not known, for now>

List 8 (refer to Fig.5I)
A domain list for types of cancer:
    kidney, lung, skin, ovarian,...

List 9 (refer to Fig.5J)
A domain list for descriptions of properties:
    <unknown, for now>.

counter.syn
ANTI-CANCER,
ANTI-VIRAL,
BLOCK,
BLOCKED,
BLOCKING,
BLOCKS,
CANCER-FIGHTING,
CEASE,
CEASED,
CEASES,
CESSATION,
CONTROL,
CONTROLLED,
CONTROLLING,
CONTROLS,
COUNTER,
COUNTERING,
COUNTERS,
CURE
CURED,
CURES,
CURING,
DESTROY,
DESTROYED,
DESTROYING,
DESTROYS,
DETER,
DETERED,
DETERS,
DISCOURAGE,
DEICOURAGED,
DISCOURAGES,
DISCOURAGING,
DESRUPT,
DISRUPTED,
DISRUPTING,
DISRUPTS,
FIGHT,
FIGHTING,
FIGHTS,
FOUGHT, HALT,
HALTED,
HALTING,
HALTS,
IMMOBILIZE,
IMMOBILIZES,
IMMOBOLIZED,
IMMOBOLIZING,
OPPOSE,
OPPOSED,
OPPOSES,
OPPOSING,
PREVENT,
PREVENTED,
PREVENTING,
PREVENTS,
REDUCE,
REDUCED,
REDUCES,
REDUCING,
RETAILIATING,
RETALIATE,
RETALIATED,
RETALIATES,
RETORT,
RETORTED,
RETORTING,
RETORTS,
SLOW,
SLOWED,
SLOWING,
SLOWS,
STOP,
STOPPAGE,
STOPPED,
STOPPING,
STOPS,
TREAT,
TREATED,
TREATING,
TREATMENTS,
TREATMENT,
TREATMENTS,
TREATS.#

COorLAB.syn

CO,
COMPANIES,
COMPANY S,
COMPANY,
GROUP S,
GROUP,
GROUPS,
INC,
INSTITUTION S,
INSTITUTION,
INSTITUTIONS,
LAB S,
LAB,
LABORATORIES,
LABORATORY S,
LABORATORY,
RESEARCH.#

Fig.5D drug.syn

COMPOUND S,
COMPOUND,
COMPOUNDS,
DRUG S,
DRUG,
DRUGS,
MEDICAMENT S,
MEDICAMENT,
MEDICMENTS,
MEDICATION S,
MEDICATION,
MEDICATIONS,
MEDICINE S,
MEDICINE,
MEDICINES,
NARCOTIC S,
NARCOTIC,
NARCOTICS.# con-app.syn                                                 Fig.5E

APPROVAL,
APPROVE,
APPROVED,
APPROVES,
CREATE,
CREATED,
CREATES,
CREATING,
DEVELOPE,
DEVELOPED,
DEVELOPES,
DEVELOPING,
DEVELOPMENT,
DISTRIBUTE,
DISTRIBUTED,
DISTRIBUTES,
DISTRIBUTING,
DISTRIBUTION,
EXPERIMENT,
EXPERIMENTED,
EXPERIMENTING,
EXPERIMENTS,
FIND,
FINDING,
FINDS,
FOUND,
MAKE,
MAKES,
MAKING,
MANUFACTURE,
MANUFACTURED,
MANUFACTURES,
MANUFACTURING,

MARKET,
MARKETED,
MARKETING,
MARKETS,
PATENT,
PRODUCE,
PRODUCED,
PRODUCES,
PRODUCING,
PRODUCT,
RESEARCH,
RESEARCHED,
RESEARCHES,
RESEARCHING,
SELLING,
SELLS,
SOLD,
STUDIED,
STUDIES,
STUDY,
STUDYING,
TEST
TESTED,
TESTING,
TESTS.#

Fig.5F properties.syn

ATTRIBUTE,
ATTRIBUTES,
CHARACTERISTIC,
CHARACTERISTICS,
FEATURE,
FEATURES,
NATURE,
PECULIARITY,
PECULIARITIES,
PROPERTY,
PROPERTIES,
TRAIT,
TRAITS.#

Fig.5G cancer.syn

CANCER S,
CANCER,
CANCER-RELATED,
CANCEROUS,
CANCERS,
CARCINOGEN S,
CARCINOGEN,
CARCINOGENIATIES,
CARCINOGENIATY,
CARCINOGENS,
CARCINOMA S,
CARCINOMA,
CARCINOMAS.#

Fig.5H

COorLAB_name.dom

| | | |
|---|---|---|
| AG S, | EUROCETUS, | |
| AG, | FRENCH, | |
| ALSZ S, | GENENTECH, | |
| ALZA, | GENETECH S, | |
| AMEGAN S, | GENZYME S, | |
| AMEGAN, | GENZYME, | |
| ANDERSON S, | GLAXO S, | |
| ANDERSON, | GLAXO, | |
| BECKMAN S, | HOFFMAN-LA S, | ROCHE, |
| BECKMAN, | HOFFMAN-LA, | ROSENBERG S, |
| BERLEX S, | HOPKINS, | ROSENBERG, |
| BERLEX, | IMMUNEX S, | SANDOZ S, |
| BIOGEN S, | IMMUNEX, | SANDOZ, |
| BIOGEN, | IMMUNUBEN S, | SCHERING S, |
| BIOSCIENCES S, | IMMUNOBEN, | SCHERING, |
| BIOSCIENCE, | IMREG S, | SCHERING-PLOUGH S, |
| BOMBAY S, | IMREG, | SCHERING-PLOUGH, |
| BOMBAY, | KAMIYA S, | SCHERINGAG S, |
| BOULDER S, | KAMIYA, | SCHERINGAG, |
| BOULDER, | LEDERLE S, | SCRIPPS S, |
| CENTOCOR S, | LEDERLE, | SCRIPPS, |
| CENTOCOR, | LIPOSOME S, | SLOAN-KETTERING S, |
| CENTUS S, | LIPOSOME, | SLOAN-KETTERING, |
| CENTUS, | LORAL S, | SMITHKLINE S, |
| CHIRON S, | LORAL, | SMITHKLINE, |
| CHIRON, | MERCK S, | SQUIBB S, |
| CONNAUGHT S, | MERCK, | SQUIBB, |
| CONNAUGHT, | NEORX S, | SYNERGEN S, |
| CROYMED S, | NEORX, | SYNERGEN, |
| CRYOMED, | NOVA S, | TRITON S, |
| DAUCHI S, | NOVA, | TRITON, |
| DAUCHI, | ONCOR S, | WARNER-LAMBERT S, |
| DEPRENYL S, | ONCOR, | WARNER-LAMBERT.# |
| DEPRENYL, | ORTHO S, | |
| ENZON S, | ORTHO, | |
| ENZON, | PLC S, | |
| ERBAMONT S, | PLC, | |
| ERBAMONT, | ROBERTS, | |
| ESCAGENETICS, | ROCHE S, | |

Fig.5I cancer_type.dom

ANTI-ULCER,
BLADDER,
BONE,
BONES,
BRAIN,
BREAST,
BREAST-CANCER,
COLON,
INTESTINAL,
INTESTINE,
KIDNEY,
LEUKEMIA,
LEUKEMIAS,
LUNG,
LYMPHOCYTES,
LYMPHOMAS,
OVARIAN,
OVARIES,
OVARY,
PANCREATIC-CANCER,
PROSTRATE,
RECTAL,
SARCOMA S,
SARCOMA,
SARCOMAS,
SKIN,
TESTICLE,
TESTICLES,
TESTICULAR,
TUMOR,
TUMORS,
ULCER S,
ULCER,
ULCERS.# properties_desc.dom

Fig.5J

| | | |
|---|---|---|
| 15-3 S, | FLUDARABINE S, | PROLEUKIN S, |
| 15-3, | FLUDARABINE, | PROLEUKIN, |
| 2-CDA S, | G-CSF S, | PROSCAR S, |
| 2-CDA, | G-CSR, | PROSCAR, |
| ACCUTANE S, | GM-CSF S, | ROFERON-A S, |
| ACCUTANE, | GM-CST, | ROFERON-A, |
| ACETATE S, | HER-2 S, | SANDOSTATIN S, |
| ACETATE, | HER-2, | SANDOSTATIN, |
| ADRIAMYCIN S, | HEXALEN S, | SEMUSTINE S, |
| ADRIAMYCIN, | HEXALEN, | SEMUSTINE, |
| ALA S, | IL-2 S, | SP-PG S, |
| ALA, | IL-2, | SP-PG, |
| AMPHOTERICIN-V S, | IMREG-1 S, | TAGAMENT S, |
| AMPHOTERICIN-B, | IMREG-1, | TAGAMENT, |
| ANTRIL S, | INTERLEUKIN-2 S, | TAMOXIFEN S, |
| ANTRIL, | INTERLEUKIN-2, | TAMOXIFEN, |
| AZT S, | LEUKOTRIENE S, | TAXOL S, |
| AZT, | LEUKOTRIENE, | TAXOL, |
| BCG S, | LIPOSOME S, | THERAUP S, |
| BCG, | LIPOSOME, | THERAUP, |
| CALMETTE-GUERIN S, | M195 S, | TRETINOIN S, |
| GALMETTE-GUERIN, | M195, | TRETINOIN, |
| CARDIOZANE S, | MAYTANSINE S, | VEPESID S, |
| CARDIOZANE, | MAYTANSINE, | VEPESID, |
| CHEMOTHERAPIES, | MIS S, | ZANTAC S, |
| CHEMOTHERAPY S, | MIS, | ZANTAC, |
| CHEMOTHERAPY, | NEUPOGEN S, | ZILADEX S, |
| DEXTRAN S, | NEUPOGEN, | ZOLADEX.# |
| DEXTRAN, | NIPENT S, | |
| EPOGEN S, | NIPENT, | |
| EPOGEN, | NOVANTRONE S, | |
| ETHYOL S, | NOVANTRONE, | |
| ETHYOL, | OCTREOTIDE S, | |
| ETOPOSIDE S, | NOVANTRONE, | |
| ETOPOSIDE, | OCTREOTIDE S, | |
| FLUDARA S, | OCTREOTIDE, | |
| FLUDARA, | PEG S, | |
| | PEG, | |

Fig.6

```
<DOC>
<DOCNO> SJMN91-06216203 </DOCNO>
<ACCESS> 06216203 </ACCESS>
<DESCRIPT> TREE: COMPANY; CANCER; DRUG; DEVELOPMENT </DESCRIPT>
<LEADPARA> Steve Hee has spent a career devising ways to grow trees faster and better
for Weyerhaeuser Co. Because of that, he now finds himself at the forefront of the
battle against cancer. ; Weyerhaeuser announced an agreement with
Bristol-Myers Squibb Co. this week to look into large-scale greenhouse
cultivation of yew trees, a scarce species that produces a life-saving cancer
drug called taxol. </LEADPARA>
<SECTION> Business </SECTION>
<HEADLINE> TREE FIRM AIMS TO GROW CANCER DRUG </HEADLINE>
<TEXT> If Hee can develop a way to quickly grow large quantities of
taxol-producing yews in a greenhouse, cancer researchers could have a large,
economical source of taxol years sooner than previously thought; "We're
pretty enthusiastic about it," said Hee, Weyerhaeuser's nursery general
manager. "We feel it's kind of neat to take some of this tree-growing
technology and apply it directly to a human-need problem."; A small San
Carlos agricultural biotechnoly company, Escagenetics Corp., has taken a
different approach. The company announced in June it had developed a method
for producing high concentrations of taxol from yew tree cuttings grown in the
laboratory.; Widely hailed as the most promising anti-cancer drug in 15
years, taxol has been shown to inhibit cancer growth and has been particularly
effective in combating ovarian and lung cancers.; Most of the research
involves taxol extracted from the Pacific yew, a scarce species found in
old-growth forests. It takes the bark of a dozen yew trees to extract enough
taxol to treat one cancer patient.; The result: A race is on to
artificially manufacture taxol, but, because it is a very complex compound,
the basic research is expected to take five or more years, with commercial
production years beyond that.; By comparison, Weyerhaeuser is taking a
simpler, more direct approach that could -- if Hee is successful -- be
economically producing large amounts of taxol in three to five years.;
Pacific yews in the wild mature in 60 years, but Hee is not aiming for fully
grown trees. "We're looking at growing yew seedlings as a source," he said.
"We're looking to grow enough biomass so that you can extract the taxol
compound." </TEXT>
<BYLINE> Seattle Times </BYLINE>
<COUNTRY> USA </COUNTRY>
<CITY> Seattle </CITY>
<EDITION> Morning Final </EDITION>
<CODE> SJ </CODE>
<NAME> San Jose Mercury News </NAME>
<PUBDATE> 910803 </PUBDATE>
<DAY> Saturday </DAY>
<MONTH> August </MONTH>
<PG.COL> 14F </PG.COL>
<PUBYEAR> 1991 </PUBYEAR>
<REGION> WEST </REGION>
<STATE> CA </STATE>
<WORD.CT> 344 </WORD.CT>
<DATELINE> Saturday August 3, 1991
00216203.SJ1 </DATELINE>
<COPYRGHT> Copyright 1991, San Jose Mercury News </COPYRGHT>
<LIMLEN> 1 </LIMLEN>
<LANGUAGE> ENG </LANGUAGE>
</DOC>
```

METHOD FOR DETECTING AND EXTRACTING TEXT DATA USING DATABASE SCHEMAS

This invention relates to information filtering processing, and in particular to a computer program-implemented filtering method and system for automatically retrieving relevant text data from both archive collections and from other document sources using schemas created by Entity-Relationship (ER) data models.

BACKGROUND AND PRIOR ART

This application is related to U.S. patent application Ser. No. 08/148,688 filed on Nov. 5, 1993 entitled: Process for Determination of Text Relevancy now U.S. Pat. No. 5,576,959, and U.S. application Ser. No. 08/350,334 filed on Dec. 6, 1995 entitled: Improved Relevancy Ranking Using Statistical Ranking, Semantics, Relevancy Feedback and Small Pieces of Text, now U.S. Pat. No. 5,642,502 by the same inventor herein, and which are incorporated by reference.

Information Filtering (herein after referred to as IF) and Information Retrieval (herein after referred to as IR) are known processes for allowing computer users to access relevant text from databases Information Filtering (IF) is a name used to describe a variety of processes involving delivery of information to people who need it. Although this term is appearing in popular and technical articles describing computer driven applications such as electronic mail, multimedia distributed systems, and electronic office documents, the distinction between filtering and related computer processes such as information retrieval (IR), routing, and categorization, and extraction is often not clear.

There are usually several characteristics and features that are typical in an Information Filtering (IF) process which will now be described. The IF process deals with unstructured or semistructural data. Structured data usually conforms to a format with components that are simple data types with well-defined meanings. For example, consider a table of people's names and ages. The first column would be character data representing a person's name, and the second column would be integer data representing a person's age. The IF process deals primarily with textual information. Unstructured data is often considered to be textual data. But, unstructured data is actually more general and includes other types of data such as images, voice, and video.

Conventional data base systems have difficulty handling unstructured data that includes text, image, voice and video data. These types of unstructured data have meanings that are difficult to represent. The IF process involves large amounts of data. The smallest example is gigabytes of text. Data that includes image, voice and video examples involve much larger amounts of data. The IF process involves streams of incoming data, either being broadcast by remote sources (i.e. newswire services) or that are sent directly by other sources (i.e. newspaper deliveries). IF can also involve accessing and retrieving information from remote sources where the incoming data is the result of a search. For remote access, "intelligent agents" are the filter that is sent to the remote data stream of text. The IF process is based on descriptions of individual and group information preferences, often referred to as profiles. Profiles typically represent long-term interests. The IF process can also include the removal of data from an incoming stream rather than finding data in that stream. The profiles can be used to express what people do not want as well as what the people do want. The IF processes and sub-process involved for text data only will be discussed in reference to FIG. 1.

Referring to FIG. 1, filtering begins by users 10 of the computer system having a relatively stable, long-term or periodic goal or desire which is labelled an "information interest" 12. This basic goal leads to regular information interests (e.g. keeping up to date on a topic) that may change slowly over time as conditions, goals and knowledge of the user change. An example of an information interest could be constantly monitoring wire services for information about taxes. The information interest(s) 12 causes people (users) 10 to engage in information-seeking behavior (i.e. having texts brought to their attention). This is accomplished by representation of the interest as a profile 14 that can be put to the filtering system.

Referring to FIG. 1, producers of the text 16 then distribute the text 18 as the text is created, so that this generated text can be brought to the user's attention. The distributed text 18 and the profile(s) 14 are then compared 20. The comparison 20 results in some of the texts being brought to the user's attention where the filtered texts 22 are evaluated as to how well this information responds to the information interest 12 from the long-term motivating goal 10. The evaluation 24 may lead to modification 26 of either or both the profile 14 or the information interest 12. The modified profile 14' is used in subsequent comparisons processes where steps 10–34 repeat over and over.

Another process often referred to as text routing is similar to filtering. Text routing involves sending relevant incoming text data to individuals or groups. Categorization systems are designed to attach one or more predefined categories to incoming objects (i.e. newswire services). The Information Filtering described in reference to FIG. 1 is different from categories because the categories generally do not change as compared to the modifiable profile(s) 14 of FIG. 1.

A still another type of process referred to as extraction systems is also slightly different from the filtering described in FIG. 1. In extraction processes, the extraction of facts from the text of incoming objects is emphasized with the determination of which objects are relevant being a second issue.

Information Retrieval (IR) systems share many of the features of IF systems and will be discussed in reference to FIG. 2 which shows the major objects and sub-processes involved in IR systems. There are several substantial differences between the IR systems of FIG. 2 and the IF system of FIG. 1. Referring to FIG. 2, an Information Retrieval (IR) system is typically concerned with single uses of a computer system by one person 40 having a one-time goal and a one-time query. In the IF system of FIG. 1, there are repeated uses 10 of the IF system by a person or persons with long-term goals or interests.

Referring back to FIG. 2, for IR the representation of the information need 42 is usually called a query of few words such as a Boolean combination of key words or a sentence or a small paragraph. In the IF system of FIG. 1, the information interest 12 is usually called a topic and can be a lengthy description of an information interest which can be much larger than a small sentence or small paragraph. The IR system of FIG. 2 recognizes that the initial query 44 of key words is flawed and can be improved usually by adding or subtracting synonyms (i.e. using Boolean connectors such as "and", "or"). The IF system of FIG. 1 assumes that the initial profile 14 describes correct specifications of interest and therefore, the profile 14 must be correctly used and does not allow for flaws. Where the IR system of FIG. 2 is concerned with the collection and organization of texts, the IF system of FIG. 1 is concerned with the distribution of texts to groups or individuals. For example, in the IR system of FIG. 2, texts 48 can be compared 50 to the query 44 and a numeric "weight" can be assigned to the text. In the IR system of FIG. 2, the retrieved texts 52 can then be collected and sorted according to their weights and presented to the user at 52. In the IF system of FIG. 1, texts 18 are compared 20 to the profile 14 and given a numeric "weight" but only those texts with weight greater than some threshold are presented to the user.

Other substantial differences between the IR systems of FIG. 2 and the IF system of FIG. 1 will further be described. Where IR systems of FIG. 2 are generally concerned with the selection of text from a relatively static collection that has already been created and usually has already been archived, the IF systems of FIG. 1 are primarily concerned with the selection or elimination of text from a dynamic data stream (i.e. wireservices and the like) where the data is new and usually has not yet been created. Since the IR systems of FIG. 2 use archived text 48, this allows for statistical information about the text to be used in the comparison step 50 in order to aid in obtaining the retrieved text. In the IF system of FIG. 1, true statistical data is not available on the dynamic incoming data stream 16, 18 since the data coming in 46 is usually new and has not yet been created. Where the IR system of FIG. 2 is concerned with responding to the user's interaction with texts within a single information-seeking episode, IF systems of FIG. 1 are concerned with long-term changes over a series of information-seeking episodes. In other words, the profile 14 in FIG. 1 needs to be stored and saved.

SUMMARY OF THE INVENTION

A first object of the instant invention to provide a system for retrieving relevant text data from a dynamically generated data stream using a schema for filtering out the relevant text.

A second object of this invention is to provide a system for retrieving relevant text data from an archive storage using a schema for filtering out the relevant text.

A third object of this invention is to represent the information-interest from a database user, as a database search schema.

A fourth object of this invention is to use database modelling techniques to form a representation of a user's information-interest A fifth object of this invention is to automatically retrieve relevant text data using a database schema.

A sixth object of this invention is to increase the percentage of documents the user reads that are relevant, and to likewise reduce the number of nonrelevant documents that must be read.

A preferred embodiment for retrieving relevant text data from a data base document collection using an Information Filtering (IF) system is disclosed. A user can use the invention to access a dynamic data stream to retrieve relevant data such as accessing e-mail or a wire-service. A user can also use this invention to access an data storage archive such as electronically stored patents, journals, legal documents, medical documents and the like. The invention has several steps. The first step has a user reduce the information they are interested in into a tangible form such as manually writing a natural language user need statement, or alternatively imputing the statement electronically into a computer file for storage. The next step is to create the filter window that will be used to electronically scan through the database collection of documents in order to determine a relevancy value for each scanned document. The filter can be created several ways including using synonym/domain lists or by entity-relationship (ER) modelling. With the former, synonym lists for each substantive word in the user need statement(s) is matched to each scanned document to determine the number of matching hits. Domain lists, which can be the actual answers that can satisfy the user need statement, are created and compared to each scanned document to determine the matching number of hits. The hits of the lists for each document are summed together and divided by a value that represents the total length of the document, creating a relevancy value for that document. The relevancy values from these lists can be calculated manually or electronically from electronically stored thesauruses, encyclopedias and the like. Alternatively, the relevancy value for each document can be determined by Entity-Relationship (ER) modelling to generate a search schema. The schema breaks up into individual synonyms for each word and becomes a filter window that is used to scan over the document collection, wherein the window moves over the collection until the relevant text data (relevant document(s)) is found. After documents receive relevancy values, the user is free to view only those documents having relevancy values that exceed a preselected threshold value. Documents can be ranked from most relevant to least relevant. Feedback information from viewing the retrieved documents can be used to update the synonym/domain lists and ER schemas of the filtering window to enhance the relevance retrieval of subsequent documents.

Other types of data such as but not limited to image, and sound data from multimedia sources can also be searched with the subject invention.

Further objects and advantages of this invention will be apparent from the following detailed description of preferred embodiments which are illustrated schematically in the accompanying drawings.

BRIEF DESCRIPTION OF THE FIGURES

FIG. 4 shows an exemplary user need statement that can be used with the flow chart of FIG. 3.

FIG. 5A illustrates the six synonym lists and four domain lists that are created with the user need statement of FIG. 4.

FIG. 5B shows Synonym List 1 of FIG. 5A.

FIG. 5C shows Synonym List 2 of FIG. 5A.

FIG. 5D shows Synonym List 3 of FIG. 5A.

FIG. 5E shows Synonym List 4 of FIG. 5A.

FIG. 5F shows Synonym List 5 of FIG. 5A.

FIG. 5G shows Synonym List 6 of FIG. 5A.

FIG. 5H shows Domain List 1 of FIG. 5A.

FIG. 5I shows Domain List 2 of FIG. 5A.

FIG. 5J shows Domain List 3 of FIG. 5A.

FIG. 6 shows a scanned document with the synonym and domain words highlighted.

DESCRIPTION OF THE PREFERRED EMBODIMENT

Before explaining the disclosed embodiment of the present invention in detail, it is to be understood that the invention is not limited in its application to the details of the particular arrangement shown since the invention is capable of other embodiments. Also, the terminology used herein is for the purpose of description and not of limitation.

A prototype of the inventor's process has been successfully used to participate in the Third Text Retrieval Conference (TREC-3) conducted by the National Institute of Standards and Technology (NIST) and sponsored by the Advanced Research Projects Agency Software and Intelligent System Technology Office (ARPA/SISTO).

Reference will now be made in detail to the present preferred embodiment of the invention as illustrated in the accompanying drawings.

The present preferred embodiment is demonstrated using a filtering environment where documents having a Relevancy Value (a measure of relevance to a user's Information Interest) above a selected Threshold are displayed to the user. Documents are not batched together. The user reviews documents above the Threshold, one-at-a-time. The user can stop after reviewing a document or continue reviewing documents as long as more documents are available.

Figure 3:
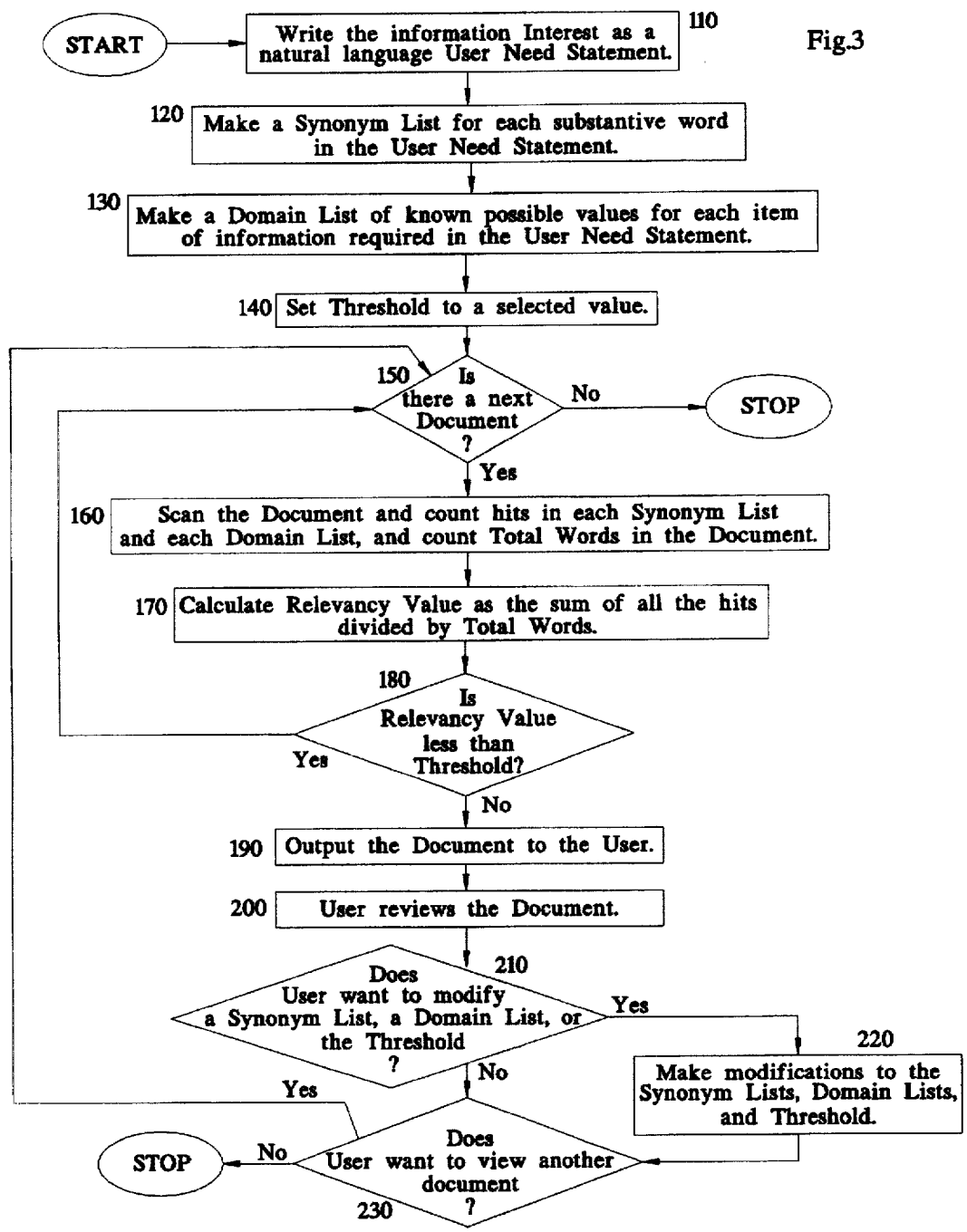
FIG. 3 shows an overview flowchart representing the preferred embodiment of the invention of using synonym and domain lists to create the filtering window to scan document collections.

FIG. 3 illustrates the preferred embodiment of the invention. At Step 110, a written description of a user's Information Interest is created in tangible form as a natural language User Need Statement. This can be done manually by the user. An example of a natural language User Need Statement is shown in FIG. 4. All of FIG. 4 was utilized as an Information Interest in the TREC-3 filtering experiment. It is an Information Interest that concerns new cancer fighting drugs. Alternatively, a user can electronically create the User Need Statement stored as a computer file in the memory of a computer.

At Step 120, the User Need Statement is scanned for substantive words. This can be done manually or automatically by a computer. Examples of words that are not substantive are "the", "a", "as", "is", and the like. In the case of User Need Statements like those used in TREC-3 filtering experiments, words such as "document" and "relevant" should also be considered not substantive because they appear in all the User Need Statements but have nothing to do with the Information Interest In IF or IR jargon, a collection of words which are not substantive is called a Stop-Word List.

At Step 120, a list of synonyms is created for each substantive word in the User Need Statement. This can be done manually by using reference information such as that found in Roget's International Thesaurus (5th Edition), edited by Robert L. Chapman, HarperCollins Publishers. Aternativiely, a computer could process this step using an electronically stored thesaurus.

FIG. 5A reveals nine fists where List 1, List 2, List 3, List 4, List 5, and List 6 ate synonym lists for six substantive words in the User Need Statement of FIG. 4. FIG. 5B shows List 1 which is a Synonym List for the word "counter". FIG. 5C shows List 2 which is a Synonym List for the words "company" or "laboratory". Using two words to generate one list of synonyms for FIG. 5C was done just to cut down on the number of lists in this example. FIG. 5D shows List 3 which is a Synonym List for the word "drug". FIG. 5E shows List 4 which is a Synonym List for the words "conceptualization" or "research" or "development" or "testing" or "evaluation" or "marketing" or "approval". Again, using several words to generate one list of synonyms for FIG. 5E was done just to cut down on the number of lists in this example. FIG. 5F shows List 5 which is a Synonym List for the word "properties". Finally, FIG. 5G shows List 6 which is a Synonym List for the word "cancer".

The synonym lists in this example are from a successfully used prototype of the inventor's process. So, the synonym lists are all shown along with their Umx operating system file names; and each entry is in capital letters. For example, all the words in List 1 (synonyms of the word "counter") are stored in a file called "counter.syn". For the successfully used prototype, all forms of a word are put in the lists. For example, the words "BLOCK", "BLOCKED", "BLOCKING", and "BLOCKS" appear in List 1. In some of the lists, the possessive form of a word also appears in the list. But note that the possessive form of a word is shown with a blank in place of the apostrophe. For example, in List 3 which is a synonym list for the word "drag", the word "MEDICATION S" appears in the list along with the word "MEDICATION". This was due to the handling of possessives within the inventor's successfully used prototype.

At Step 130, a list of possible values (a Domain List) is created for each item of information required by the User Need Statement. This can be done manually using references available to the user. Alternatively, information that exists in electronic storage can also be used to create a Domain List In FIG. 5A, three lists are domain lists. These are List 7, List 8, and List 9. FIG. 5H shows List 7 which is a Domain List for the name of a company or laboratory. Originally, List 7 only had two entries in it and these were the words "SQUIBB" and "ROCHE". This is shown in FIG. 5A. Eventually, List 7 became the list shown in FIG. 5H. FIG. 5I shows List 8 which is a Domain List for the different types of cancer. FIG. 5J shows List 9 which is a Domain List for descriptions of drug properties. Originally, List 9 was empty. This is shown in FIG. 5A. Eventually, List 9 became the list shown in FIG. 5J.

The domain lists in this example are from a successfully used prototype of the inventor's process. So, the domain lists are all shown with their Unix operating system file names; and each entry is in capital letters.

At Step 140, a value greater than zero can be selected for the Threshold value. If zero is the selected value, then all incoming documents would be seen by the user.

Figure 7:
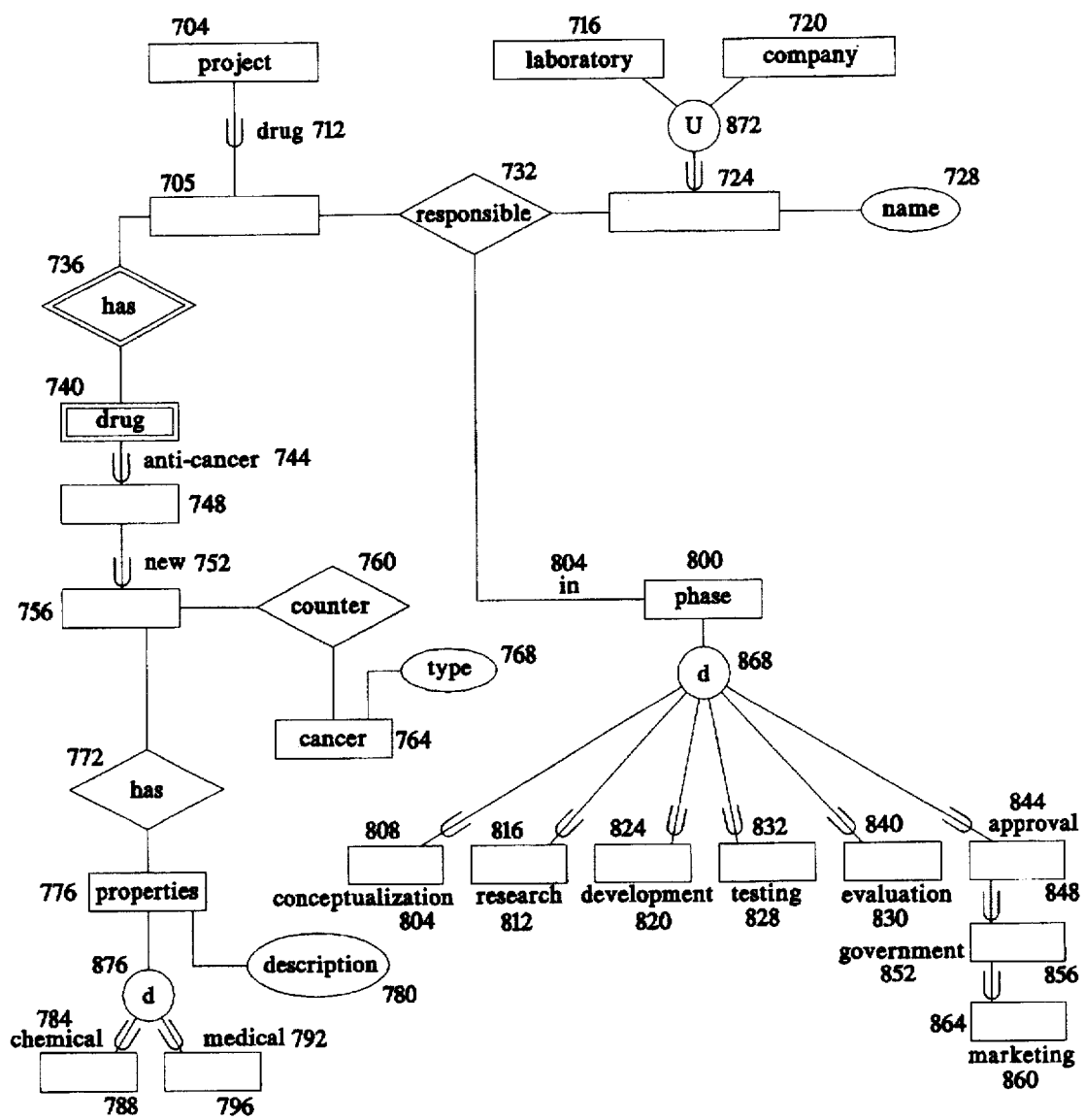
FIG. 7 shows the alternative Entity-Relationship (ER) model that can be used to create the novel filter in FIG. 3.

If a document is available, Step 150 causes movement to Step 160. If no more documents are available, the filtering process stops. FIG. 7 is an example of an incoming document which was electronically stored.

At Step 160, the electronically stored Document is automatically scanned and a count is incremented each time a matched hit occurs. A matched hit occurs when a word in the Document is found in a Synonym List or a Domain List. A count of Total Words in the Document is also incremented in order to determine the overall length of the Document. As an example, consider the Document shown in FIG. 6. The words which are found in List 1 through List 9 of FIG. 5A through FIG. 5J are underlined in the text of FIG. 6.

At Step 170, a Relevancy Value for the Document is calculated based on the data collected at Step 160. The Relevancy Value is calculated by dividing the total matched hits by the Total Words in the Document. As an example, consider the Document in FIG. 6. There are 39 words in the Document that appear in List 1 through List 9 of FIG. 5A through FIG. 5J which are underlined. Total Words in the Document is 338. The Relevancy Value for the Document in FIG. 6 is 39/338, which is 0.1154.

At Step 180, the Relevancy Value is compared to the Threshold. A Relevancy Value less than the Threshold causes movement to Step 150 and the Document is not shown to the user. A Relevancy Value greater than or equal to the Threshold causes movement to Step 190.

At Step 190, the Document is displayed or output to the user. Words in the Document that appear in a Synonym List or a Domain List could be highlighted in the display. At Step 200, the user reads or reviews the Document.

Figure 1:
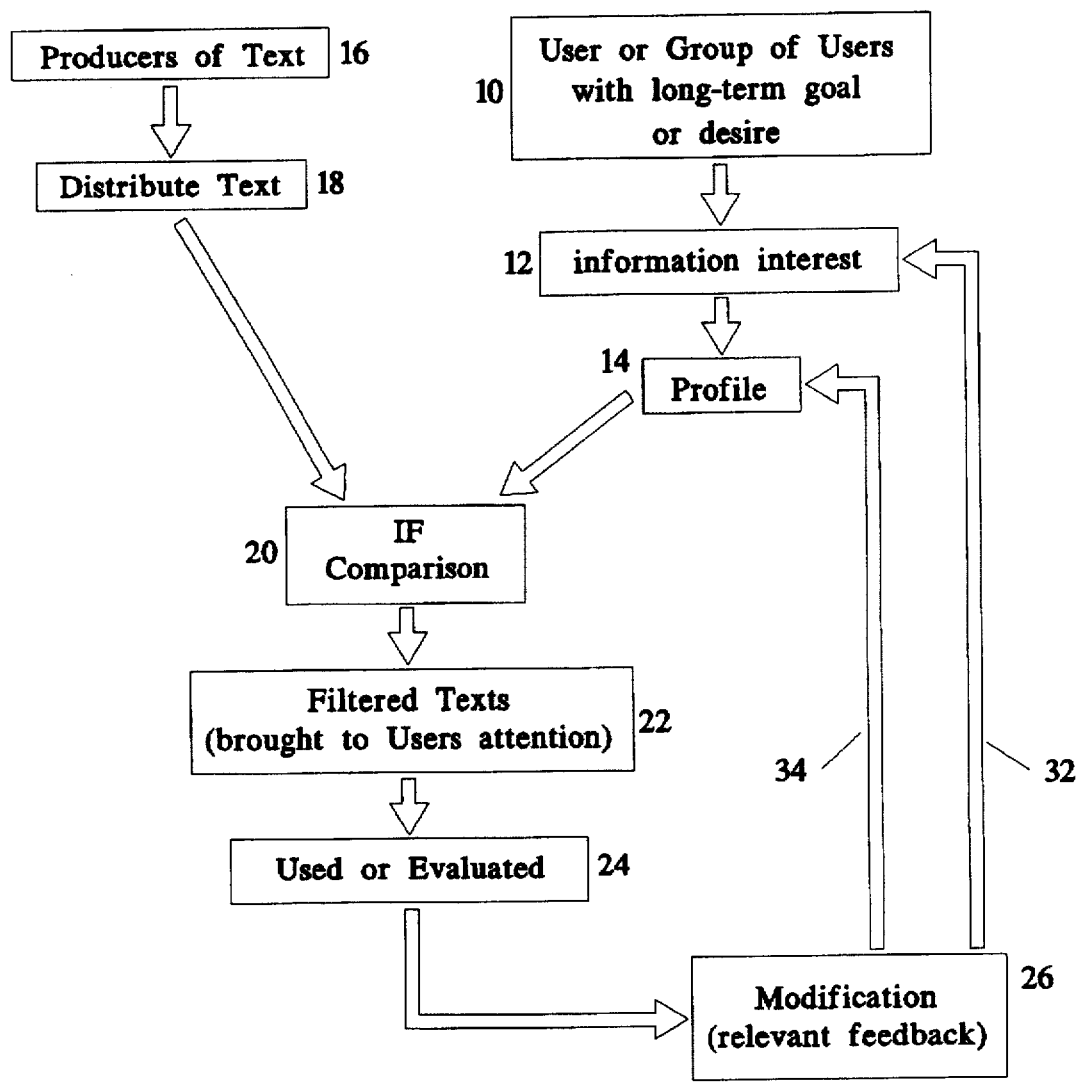
FIG. 1 shows a prior art model of an Information Filtering (IF) process for retrieving text data.
Figure 2:
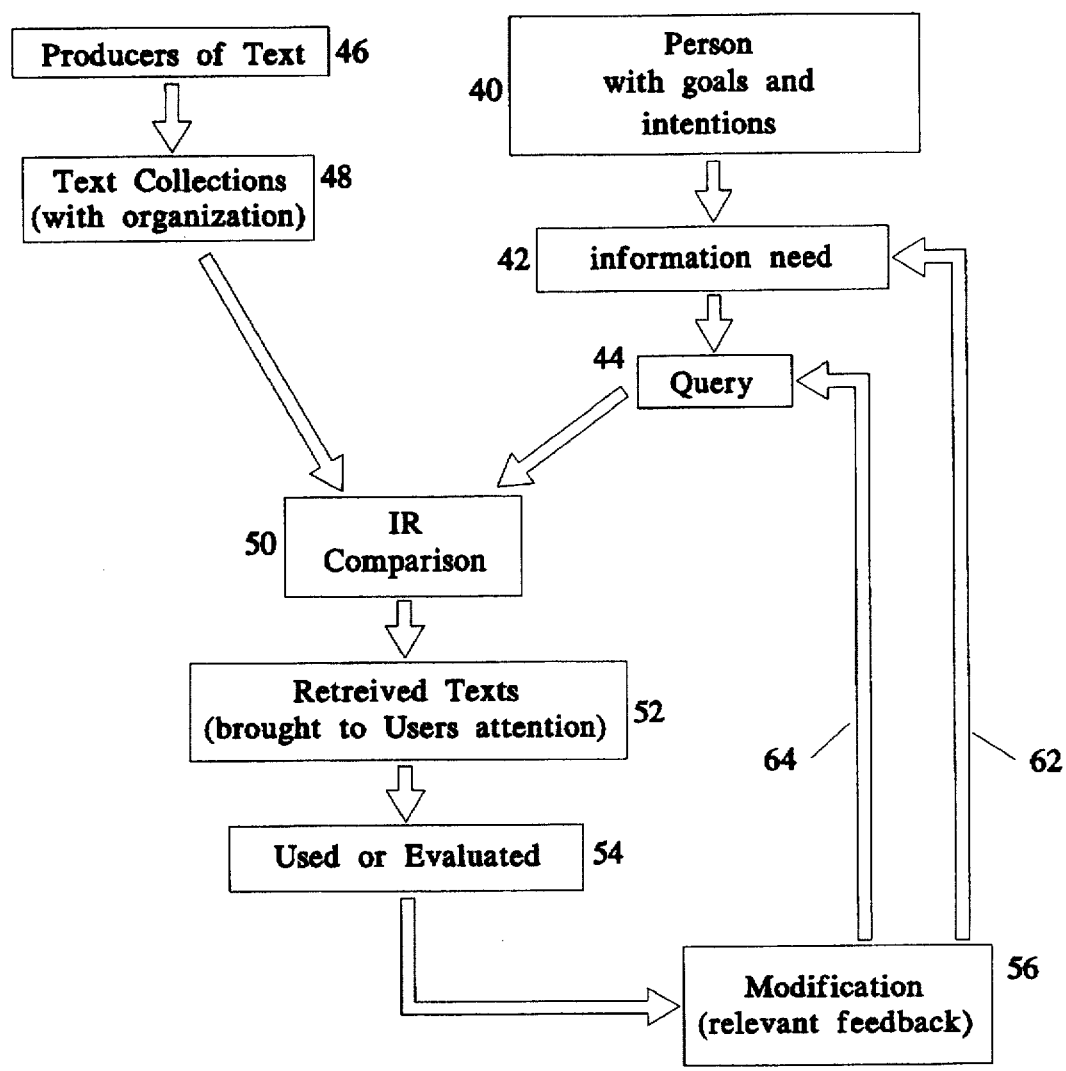
FIG. 2 shows a prior art model of an Information Retrieval (IR) process for retrieving text data.

After reviewing the Document, at Step 210, the user decides if there needs to be a modification to a Synonym List, a Domain List, or the Threshold. For example, the word "production" appears in the Document of FIG. 6 but is not in the Synonym List of FIG. 5E. The user can put the word "production" in the FIG. 5E list. As another example, the word "combating" appears in the Document of FIG. 6 but is not in the Synonym List of FIG. 5B. The user can put the word "combating" in the FIG. 5B list. Modifications to a Synonym List, a Domain List, or Threshold by the user is called relevance feedback and this is shown as Step 26 in FIG. 1. In FIG. 3, relevance feedback occurs at Step 220.

At Step 230, the user decides if more documents are to be filtered. If no more filtering is necessary, the filtering process stops, otherwise there is movement to Step 150 where document filtering continues.

An alternative technique for creating Synonym Lists and Domain Lists will now be described. From a database point of view, the User Need Statement of FIG. 4 represents the data requirements analysis of a small enterprise (real-world situation). Semantic modeling can be used to capture such an analysis. The Entity-Relationship (ER) model is a semantic model. The ER model includes the semantic concepts of Entity Sets, Attributes, Relationships, Specialization, Generalization, and Categorization.

An Entity Set is a collection of objects which have common attributes. Each attribute is associated with a domain of possible values. Objects can have a physical existence (such as a person) or a conceptual existence (such as a company, or laboratory). Some attributes can be used to identify an object in an entity set (such as Social Security Number for a person). Some entity sets may be weak because objects in the entity set are identified by being related to specific objects from another entity set.

A Relationship is a set of associations among objects in one entity set and objects in other entity sets. For example, between the entity set of drugs and the entity set of cancers, them can be a relationship representing which drug counters which cancer. Each entity set that participates in a relationship plays a particular role in the relationship. Relationships can also have attributes.

Specialization, Generalization, and Categorization are concepts that describe the superclass/subclass relationships that can exist among entity sets. Subclasses can inherit attributes, predicates can be used to define subclasses, multiple subclasses can be disjoint or overlapping, and the union of classes can be formed.

An ER diagram or schema is a technique for representing the logical structure of a database in a pictorial manner. As such, it provides a means of communicating the features of the database design. The major diagramming rules follow:

Each entity set is shown as a rectangle.

Each attribute is shown with an ellipse.

Each relationship is shown as a diamond with lines to the participating entity sets, and roles can be identified by labeling the lines.

A weak entity set and its identifying relationship are distinguished by using double lines for the rectangle and the relationship.

A subclass relationship is indicated with a line and a subset symbol and can include a predicate.

Overlapping subclasses are indicated with a circled "o".

Disjoint subclasses are indicated with a circled "d".

The union of classes is indicated by a circled "u".

FIG. 7 shows an ER Model schema for the User Need Statement in FIG. 4. Like the User Need Statement in FIG. 4, the schema specifies the information that must be detected within a section of text to decide whether or not the text is relevant to the Information Interest.

ER schemas can be created following rules using a narrative description (a User Need Statement) of the database requirements. The nouns appearing in the narrative give rise to entity sets, verbs indicate relationships, adjectives indicate predicates, additional nouns that modify other nouns indicate entity attributes, and the like.

By comparing the User Need Statement in FIG. 4 to the ER schema in FIG. 7, the schema reflects the sentences read in the User Need Statement. The ER diagram is broken down into its smallest components in the sense that every component is labeled with a single word found in the topic. For example, the phrase "drug project" in the User Need Statement, FIG. 4, became the entity set "project", 704 in FIG. 7, with a specialized entity, 708, for the phrase "drug project" in FIG. 4. The adjective "drug" became a predicate, 712 in FIG. 7, for the superclass/subclass relationship. Likewise, similar relationships exist for remaining components 716 through 876 in FIG. 7.

A synonym list is created for each substantive component of the ER diagram. Several synonym lists can be merged at 868, 872, and 876 into single lists. For example, the Synonym List for the word "laboratory" at 716 is combined with the Synonym List for "company" at 720. FIG. 5C is a Synonym List for this combination. A Domain List is created for each attribute in the ER diagram. In FIG. 7, there are three attributes at 728, 768, and 780. For example, a Domain List for the name of a company or laboratory, 728, is created. FIG. 5H is an example of this Domain List.

The preferred embodiment of the invention can be further modified and extended into improving the Relevancy Value calculation for the retrieved text and to make further use of the feedback of the actual user of the system.

Instead of viewing a whole document, a sliding window of adjustable size can be used to view text. Relevancy can further be enhanced by weighting each Domain List and each Synonym List. Relevancy can be further enhanced by using alternative combinations of the Domain Lists and the Synonym Lists.

Although the preferred embodiment describes accessing relevant text type dam, other types of data can also be accessed with the described invention. Other types of data such as but not limited to image/fixed pictures, video/moving pictures, sound/voice, and/or other sensed data can also be accessed, as long as the data can be reduced to a tangible form as in a digital representation.

While the invention has been described, disclosed, illustrated and shown in various tens of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. An Information Filtering (IF) system for retrieving relevant text from a database collection of documents comprising the steps of:

(a) defining an information interest as a natural language statement;

(b) creating a synonym list from each substantive word in the natural language statement;

(c) creating a domain list from the natural language statement;

(d) combining the synonym lists and the domain lists into a filter window;

(e) selecting a minimum threshold value for the filter window;

(f) scanning a first document having a first total length of a database collection with the filter window in order to calculate both a first value and a second value, wherein the first value is the number of matches between words in the synonym lists and corresponding words in the first document, and the second value is the number of matches between words in the domain lists and corresponding words in the first document;

(g) adding the first value to the second value to form a sum value, and dividing the sum value by the total length value of the first document to form a relevancy value for the first document; and (h) repeating steps (a) through (g) for subsequent documents from the database collection if the relevancy value of each subsequent document is less than the minimum threshold value.

2. The Information Filtering (IF) system of claim 1, wherein the information interest of step (a) is chosen from at least one of:

a topic of interest, a natural language query, and an area of interest.

3. The Information Filtering (IF) system of claim 1, wherein the database collection of step (f) includes:

a stream of data from a non-archive collection.

4. The Information Filtering (IF) system of claim 3, wherein the stream of data is selected from at least one of:

a wire service and e-mail.

5. The Information Filtering (IF) system of claim 1, wherein the database collection of step (f) includes:

an archive collection of data.

6. The Information Filtering (IF) system of claim 1, further including the steps of:

(i) modifying the synonym lists, the domain lists and the minimum threshold value for subsequent documents from the database collection if the relevancy value of each subsequent document is greater than the minimum threshold value, and repeating steps (a) through (g) for the subsequent documents.

7. The Information Filtering (IF) system of claim 1, wherein the substantive words further includes:

words that were not preselected for a stop-word list.

8. The Information Filtering (IF) system of claim 1, wherein the domain list includes:

words that answer the information interest.

9. An Information Filtering (IF) system for retrieving relevant data from a database comprising:

a database of documents;

a natural language need statement created from information interest of a user of the database;

a filter window of search words formed from the natural language need statement, wherein the filter window has a list of synonyms for each substantive word in the natural language need statement, and a list of domain words for satisfying portions of the natural language need statement;

means for scanning the database with the filter window to calculate relevancy values for each document in the database, wherein the relevancy values of each document includes:

a first value equal to the number of matches between words in the synonym lists and corresponding words in the first document, and a second value equal to the number of matches between words in the domain lists and corresponding words in the first document;

a sum value of the first value added together with the second value; and a total length value for the each document, wherein the relevancy value is equal to the sum value divided by the total length value; and means for ranking the relevancy values into a hierarchy list of documents from most important documents to the least important documents.

10. The Information Filtering (IF) system of claim 9, wherein the filter window further includes:

a synonym list and a domain list formed from an entity-relationship model.

11. An automatic method for retrieving relevant text information from a database using an Information Filtering (IF) system, comprising the steps of:

(a) generating a search schema filter by using an entity relationship model to generate the search schema, the model further including:

(i) generating a first entity;

(ii) generating a second entity; and (iii) generating a relationship between the first entity and the second entity, and wherein the first entity, the second entity and the relationship, each include a single word; and (iv) generating a synonym list and a domain list for each single word;

(b) searching database documents with the search schema filter for relevant documents; and (c) ranking the relevant documents.

* * * * *